(12) United States Patent
Castillo et al.

(10) Patent No.: US 9,262,199 B2
(45) Date of Patent: *Feb. 16, 2016

(54) VIRTUALIZATION AND DYNAMIC RESOURCE ALLOCATION AWARE STORAGE LEVEL REORDERING

(71) Applicant: INTERNATIONAL BUSINESS MACHINES CORPORATION, Armonk, NY (US)

(72) Inventors: Claris Castillo, White Plains, NY (US); Canturk Isci, West New York, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/687,430

(22) Filed: Apr. 15, 2015

(65) Prior Publication Data

US 2015/0220359 A1 Aug. 6, 2015

Related U.S. Application Data

(63) Continuation of application No. 13/963,381, filed on Aug. 9, 2013, now Pat. No. 9,043,790, which is a continuation of application No. 12/777,394, filed on May 11, 2010, now abandoned.

(51) Int. Cl.
*G06F 9/455* (2006.01)
*G06F 9/50* (2006.01)
*G06F 12/08* (2006.01)

(52) U.S. Cl.
CPC ........ *G06F 9/45558* (2013.01); *G06F 9/45533* (2013.01); *G06F 9/5077* (2013.01); *G06F 12/08* (2013.01); *G06F 2009/45583* (2013.01); *G06F 2212/657* (2013.01)

(58) Field of Classification Search
None
See application file for complete search history.

(56) References Cited

U.S. PATENT DOCUMENTS 6,321,373 B1 11/2001 Ekanadham et al.
6,732,220 B2 5/2004 Babaian et al.
7,523,286 B2 4/2009 Ramany et al.
(Continued)

FOREIGN PATENT DOCUMENTS

TW 405091 9/2000
TW 200723013 6/2007

OTHER PUBLICATIONS

Boutcher, D., et al. "Does Virtualization Make Disk Scheduling Passe?" Proceedings of the 1st Workshop on Hot Topics in Storage and File Systems (HotStorage '09). Oct. 2009. (5 pages).
(Continued)

*Primary Examiner* — Gregory A Kessler
(74) *Attorney, Agent, or Firm* — Tutunjian & Bitetto, P.C.; Mercedes Hobson

(57) ABSTRACT

A system and method for reordering storage levels in a virtualized environment includes identifying a virtual machine (VM) to be transitioned and determining a new storage level order for the VM. The new storage level order reduces a VM live state during a transition, and accounts for hierarchical shared storage memory and criteria imposed by an application to reduce recovery operations after dynamic resource allocation actions. The new storage level order recommendation is propagated to VMs. The new storage level order applied in the VMs. A different storage-level order is recommended after the transition.

20 Claims, 3 Drawing Sheets

(56) References Cited

U.S. PATENT DOCUMENTS

| 2007/0234337 | A1 | 10/2007 | Suzuki et al. |
| 2008/0172539 | A1 | 7/2008 | Boss et al. |
| 2008/0270674 | A1 | 10/2008 | Ginzton |
| 2008/0288718 | A1 | 11/2008 | Hepkin et al. |
| 2009/0204718 | A1 | 8/2009 | Lawton et al. |

OTHER PUBLICATIONS

Considine, J.P., et al. "MARC: MVS Archival Storage and Recovery Program" IBM Systems Journal. vol. 16, No. 4. 1977. pp. 378-397.

Hines, M., et al. "MEMX: Supporting Large Memory Workloads in Xen Virtual Machines" Proceedings of the International Workshop on Virtualization Technology in Distributed Computing (VTDC). Nov. 2007. pp. 1-8.

Hines, M., et al. "Post-Copy Based Live Virtual Machine Migration Using Adaptive Pre-Paging and Dynamic Self-Ballooning" VEE '09. International Conference on Virtual Execution Environments (VEE). Mar. 2009. (10 pages).

Huang, W., et al. "High Performance Virtual Machine Migration With RDMA Over Modern Interconnects" Proceedings of the 2007 IEEE International Conference on Cluster Computing. Sep. 2007. (10 pages).

IBM. "Automating Virtual Machine Migration in a San Environment" Mar. 2009. pp. 1-3.

Jin, H., et al. "Live Virtual Machine Migration With Adaptive Memory Compression" IEEE Cluster 2009. Proceedings of the 2009 IEEE International Conference on Cluster Computing, Aug.-Sep. 2009. (28 pages).

Liu, H., et al. "Live Migration of Virtual Machine Based on Full System Trace and Replay" HPDC '09. Proceedings of the 18th ACM International Symposium on High Performance Distributed Computing, HPDC 2009. Jun. 2009. pp. 101-110.

Voorsluys, W., et al. "Cost of Virtual Machine Live Migration in Clouds: A Performance Evaluation" Cloud Computing, First International Conference, CloudCom 2009. Dec. 2009. pp. 1-12.

Zhao, M., et al. "Experimental Study of Virtual Machine Migration in Support of Reservation of Cluster Resources" 2nd International Workshop on Virtualization Technologies in Distributed Computing (VTDC). Nov. 2007. (8 pages).

Zhao, M., et al. "Experimental Study of Virtual Machine Migration in Support of Reservation of Cluster Resources" Advanced Computing and Information Systems (ACIS) Electrical and Computer Engineering. Nov. 2007. pp. 1-21.

VIRTUALIZATION AND DYNAMIC RESOURCE ALLOCATION AWARE STORAGE LEVEL REORDERING

CROSS-REFERENCE TO RELATED APPLICATIONS

This application is a Continuation application of allowed co-pending U.S. patent application Ser. No. 13/963,381 filed on Aug. 9, 2013, which is a Continuation application of abandoned U.S. patent application Ser. No. 12/777,394 filed on May 11, 2010, incorporated herein by reference in its entirety.

BACKGROUND

1. Technical Field

The present invention relates to efficient interoperation of computing technologies, and more particularly to systems and methods for storage level reordering for virtual and dynamic resource allocation for memory-intensive applications.

2. Description of the Related Art

Emerging Internet-scale service applications operate on large amounts of data that are maintained in memory to achieve high throughput and offer low response time guarantees to users. Key catalyzers to this trend have been the significant decrease of memory cost, increase of memory capacity in machines and development and adoption of in-memory distributed storage technologies such as memcached, XAP and ObjectGrid™ As a result, In-Memory Data Grids (IMDGs) have become the cost- and performance-effective solution for such vast-scale and distributed data provisioning. Thus, many Web-scale businesses, such as Facebook™ and Twitter™, rely on some form of such memory-backed data grids to operate while scaling to a large number of users.

Facebook™, for example, stores all its indexing information on a memcached to speed up the access to large objects from backend storage servers in a timely manner. Other non-traditional data oriented applications, e.g., fraud detection, rely on IMDG to collect and analyze operational data in an on-line fashion.

Virtualization technologies are becoming more important in large-scale data center and cloud infrastructures. In addition to the simplified management and provisioning benefits, these virtualized environments enable dynamic optimizations to the cloud operation by dynamically reallocating distributed resources to the running virtualized entities. By repositioning and reprovisioning virtual machines (VMs), virtualized environments provide agile runtime response to the dynamically-varying requirements of data centers. This alleviates the inefficiencies of the existing statically-allocated information technology (IT) infrastructure model due to the severe over-provisioning and inefficient underutilization of computing resources.

While both of these trends have proven to be effective exclusively in their domains and continue to gain increasing momentum, they exhibit a striking conflict in their characteristics that can hamper their effectiveness under joint operation in a cloud environment. More specifically, on one hand, IMDG solutions benefit from exploiting large amounts of random access memory (RAM) to manage data and therefore, they tend to heavily exercise memory for effective operation.

On the other hand, dynamic VM allocation in virtualization performs best by transferring as little live state as possible across physical entities during VM reallocation. It is well known that there is a strong positive correlation between the amount of live state a VM has and the migration overheads it can experience. The main contributors to the live state are the amount of 'active memory' or the working set size of the VM, the rate at which the pages are dirtied in memory and the overall footprint of the VM. Therefore, their dynamic response efficiency is inversely affected while allocating VMs with heavy memory usage. This has at least two detrimental effects: (1) higher performance overhead perceived by the applications using IMDG nodes as the response times increase under dynamic allocation conditions; and (2) energy overheads due to extensive copying and recopying of live state, as well as higher resource and link usage.

SUMMARY

Migration latency depends on an active footprint of a virtual machine (VM). For example, a 16× increase in active memory leads to an almost 32× increase in the total migration overhead. Corresponding CPU and memory usage during these migrations show an average of 40% single-core CPU overhead while migrating a VM from a source host, and around 20% CPU overhead while migrating a VM to a destination host. In both directions, the migration traffic can saturate 1 Gbps links throughout migration. Quite significant degradations can also be observed in the application performance, such as service times, depending on the application characteristics and the level of overcommitment on the host. Therefore, an efficient migration-aware state management from both resource management technology and application performance management technology perspectives is needed. The present principles provide a virtualization- and dynamic-resource-allocation-aware storage level reordering method (VSLR) for memory-intensive applications, as an in-memory data grid (IMDGs), for highly-effective interoperation of these two growing technologies. With both technologies becoming widely adopted in similar large-scale computing and cloud-based infrastructures, such interoperation provides cooperation between these technologies and others.

A system and method for reordering storage levels in a virtualized environment includes identifying a virtual machine (VM) to be transitioned and determining a new storage level order for the VM. The new storage level order reduces a VM live state during a transition, and accounts for hierarchical shared storage memory and criteria imposed by an application to reduce recovery operations after dynamic resource allocation actions. The new storage level order recommendation is propagated to VMs. The new storage level order is applied in the VMs. A different storage-level order is recommended after the transition.

A method for reordering storage levels in a virtualized environment includes identifying a virtual machine (VM) to be reprovisioned or repositioned to a new location; retrieving profiling information regarding usage and availability of multiple storage levels and devices; and determining a new storage level order for the VM using the profiling information that reduces a VM live state during a migration transfer or reprovisioning and accounts for at least shared storage memory, VM virtual disk locations and service level agreement (SLA) requirements imposed by an application to reduce recovery operations after dynamic resource allocation actions. The new storage level order recommendation is propagated to VMs, and the new storage level order is applied to the VMs. An original storage-level order is reverted back to after the reprovisioning or repositioning actions. Resource allocation is computed for a current cluster state to determine whether further reprovisioning or repositioning of VMs is needed. The method is continued until further VM reprovisioning or repositioning is complete.

A system for dynamically reordering storage levels for applications in virtualized systems includes a virtual machine to be reprovisioned or repositioned, stored in a memory storage device. A virtualized resource manager (VRM) is configured to recommend a new storage level order in a memory media hierarchy for the VM that reduces a VM live state during reprovisioning or migration, accounts for storage levels based upon profiling information, and reduces recovery operations after dynamic resource allocation actions. A virtualization- and dynamic-resource-allocation-aware storage level reordering (VSLR) module is configured to propagate and apply the new storage level order recommendation to appropriate memory intensive VMs such that reordering mitigates the performance overhead of VM reprovisioning or repositioning actions.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
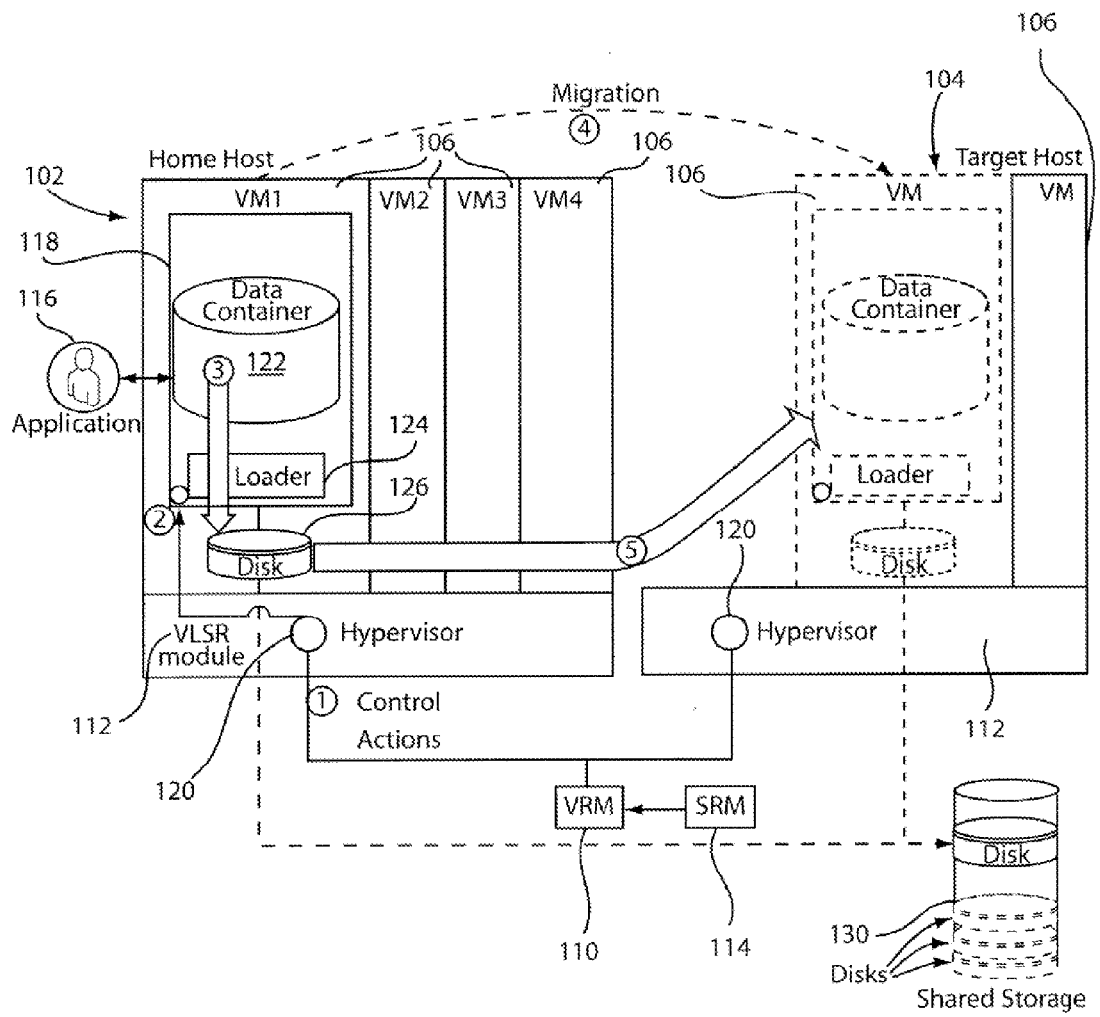
FIG. 1 is a block/flow diagram showing a computing environment with an illustrative migration of a virtual machine (VM) in accordance with the present principles.

The present principles provide a system having multi-level data storage including a low latency/high bandwidth storage medium, e.g., RAM, and a higher latency/lower bandwidth storage medium, e.g., disk, which operate in a hierarchical fashion. In the context of, e.g., in-memory data grid (IMDG) appliances, a storage level with best latency/size ratio is considered primary and hence has the highest priority in the hierarchy. For example, IMDG technologies, such as Object-Grid™, operate primarily on RAM and rely on disk storage to respond to overflow conditions.

A virtualization- and dynamic-resource-allocation-aware storage level reordering (VSLR) module permits applications such as IMDGs to work in conjunction with a system virtual resource manager (VRM) to mitigate overhead resulting from virtual machine (VM) migration by effectively reducing live state data of a hosting VM to be migrated. Reducing the active state of these applications can lead to several orders of reductions in dynamic resource allocation overheads.

To do this, IMDG nodes reorder the storage hierarchy levels upon migration of the hosting VM by demoting RAM to secondary storage and promoting lower storage levels in the hierarchy. In other words, IMDG nodes are capable of interacting with different levels of the storage hierarchy throughout their life cycle as dictated by a VSLR management system. Furthermore, in VSLR the order is determined by the application (IMDG) and the resource manager in conjunction so that application and the system requirements are both met.

By adopting VSLR, a Cloud provider, for example, can effectively manage the provisioning and repositioning of resources while meeting the requirements of Cloud services that rely heavily on IMDG solutions to manage distributed data under high response time constraints. No known solution addresses the problem of managing services such as IMDG in a virtual environment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to the drawings in which like numerals represent the same or similar elements and initially to FIG. 1, a system 100 and method for a cooperative technology environment is illustratively depicted. System 100 illustratively includes a virtual environment having five main components: physical machines 102, 104, virtual machines 106, Virtual Resource Manager (VRM) 110, Virtualization- and dynamic-resource-allocation-aware storage level reordering (VSLR) module 112 and Storage Resource Manager (SRM) 114.

Applications 116 are hosted by individual VMs 106, and physical machines 102, 104 may host multiple VMs 106. Each VM 106 has a share of resources (network, memory and CPU) allocated at boot time to the VM 106 and shares resources with other VMs 106 co-hosted in the same physical machine 102, 104. The VSLR system 100 illustratively shows two physical machines: a Home machine (Home) 102 and a Target machine (Target) 104, hosting multiple VMs 106. Home 102 hosts a VM 106 (VM1) with an IMDG node 118 that is to be migrated to Target 104.

SRM 114 is responsible for monitoring storage usage across the storage hierarchy in the system 100. SRM 114 builds profiling information for storage and storage devices and provides the profiling information to the VRM 110. The VRM 110 is responsible for making decisions regarding the repositioning (migration) and reprovisioning of virtual machines 106; coordinating with the VSLR module 112 and SRM 114, when needed, and determining a new storage level order for an IMDG (118) to use when its hosting VM (106) has been selected for potential repositioning. VRM 110 and hypervisors 120 are the only components that need to be aware of dynamic resource management decisions. VSLR modules 112 and the VMs 106 only need to receive the dynamic storage level reordering recommendations without necessarily being aware of the underlying virtualization layer.

VSLR module 112 plays a mediator role between the IMDG nodes 118 and the VRM 110. VSLR module 112 can be implemented as an agent or as an auxiliary VM 106 in each host 102 or 104. VSLR module 112 is responsible for informing the IMDG nodes 118 of the storage level reordering recommendations and reporting to the VRM 110 employed storage level orders by each node.

During a migration, system 100 performs the following illustrative functions as indicated by circled numbers in FIG. 1: (1) VRM 110 informs VSLR module 112 of VM1 being selected for migration and suggests a new storage level order for the IMDG node 118 hosted in VM1 (disk only in this case). (2) VSLR module 112 propagates the new storage level order recommendation to the IMDG container 122 in VM1; (3) IMDG 118 follows the new order and enters Allocation-Aware Mode and writes to a disk 126 for all future incoming transactions; (4) Migration of VM1 starts and finishes; (5) IMDG 118 optionally enters into Recovery Mode and syncs Home machine 102 and Target machine 104, if necessary, by applying transactions committed during migration; VRM 110 recommends reversing the storage level order to Normal Mode via VSLR module 112.

The present embodiments are particularly useful for any in-memory intensive application, e.g., memcached, Object-Grid™, etc. However, the present implementation varies depending on the application. The above implementation is based on the context of ObjectGrid™ (IBM IMDG). ObjectGrid™ has built-in capabilities to interact with different storage devices 130 through a loader module 124 embedded in the physical devices 102, 104 (e.g., server) and hence, it is an ideal illustrative choice for this disclosure. Other configurations and contexts are also contemplated.

Whenever a VM has been marked for repositioning, the VRM 110 informs the VSLR module 112 in the Home machine 102 and suggests a new storage level order following profiling information obtained from the SRM 114 (see circled 1). The VSLR module 112 then informs the IMDG node 118 hosted in the selected VM of the recommended storage order.

As soon as the VRM 110 selects a given VM 106 hosting an IMDG application 116 for repositioning, the VRM 110 obtains storage profiling information from the SRM 114. For example, VRM 110 may obtain the current read/write request rate of the local disk 126 or the current usage of the flash memory card attached to the Home machine 102. The VRM 110 uses this information to suggest to the corresponding VSLR module 112, a new storage level order for the IMDG node 118 to use. For example, assuming that the Home machine 102 has access to a remote shared storage 130 and local storage 126, the VRM 110 may suggest remote storage as primary storage if its effective bandwidth is above a certain threshold and use local disk 126 or main memory (not shown) to handle overflow conditions.

One strength of the present principles stems from performing this storage level reordering in a virtualization-aware manner. In many existing virtualized infrastructures a shared, external storage, in the form of a storage area network (SAN) or network-attached storage (NAS), is used to back the virtual hard disks of VMs 106. A virtual hard disk of the IMDG VM 118 that is to be migrated can likely be residing on such an external storage (130). In this case, promoting the VM's disk as the primary storage alleviates the need to retransfer any live state as all further updates are directly visible to the VM after migration as the VM's disk location is unchanged and shared across hosts. In this operation, VSLR module 112 helps efficiently manage IMDGs 118 in virtualized environments by dramatically mitigating the overhead of dynamic resource allocation actions of the underlying virtualization management layer. The overall IMDG operation continues with minimal disruption other than the reordering of storage levels. Nonetheless, as demonstrated by the present inventors, shared storage is not a brick wall necessity for dynamic resource allocation. More importantly, applications with strong data-locality requirements—such as Mapreduce™ and data-analytics—benefit greatly from using VMs with attached storage. Under such conditions, VMs with detached storage can be migrated across hosts.

For generally accommodating these cases, the present embodiments introduce a separate IMDG operation mode for recovery after resource allocation. For dynamic reordering of storage level, we may assume that the IMDG node 118 adopts the order recommended by the VSLR module 112. Nevertheless, this assumption can be easily relaxed to accommodate for more intelligent application-based resource management techniques. Throughout its life cycle an IMDG node can switch between multiple modes, e.g.: Normal Mode, Transition Mode and Recovery Mode. Other modes can be designed and implemented, as needed.

In Normal Mode an IMDG 118 operates with the storage level order determined at boot time. In other words, user transactions are effected into IMDG main memory only and secondary storage is used under overflowing conditions. This corresponds to the normal operation of an IMDG node. The IMDG node 118 enters into the Transition Mode as soon as it obtains the new storage level order from the VSLR module 112. During this mode the IMDG node 118 is enabled to follow a different storage level order—as suggested by the VRM 110—to effectively write-through a storage device that may have a lower order in the Normal Mode. This results in a reduction on the amount of live state data in the VM hosting the IMDG node 118, and thus drastically reduces the overhead of dynamic resource allocation.

An IMDG node 118 can switch to Recovery Mode after a Transition Mode triggered during VM migration, i.e., after the VM's live state data has been migrated to the Target machine 104. This mode includes applying all the transactions committed while the IMDG 118 was in Transition Mode to the memory space assigned to the IMDG node in the Target machine 104. This is not a generally necessary mode if the transactions committed in the transition mode are already persisted to the VM 106 as in the case of shared storage model. Overall, the present principles describe a unique and effective method for efficient interoperation of virtualization resource management and memory intensive applications, with specific emphasis on IMDGs although other system may be employed. By incorporating the described VSLR module 112 into their joint operation and enabling dynamic reordering of the storage levels, the present embodiments provide an efficient approach to manage two important cloud computing technologies that otherwise exhibit competing characteristics. The described systems and methods transform such competing characteristics into a clearly-defined cooperative operation.

In particular, efficient migration-aware state management from both resource management and application performance management perspectives is provided by employing the VSLR module 112 in accordance with the present principles. The VSLR module 112 is especially useful for memory-intensive applications for highly-effective interoperation between different technologies.

Figure 2:
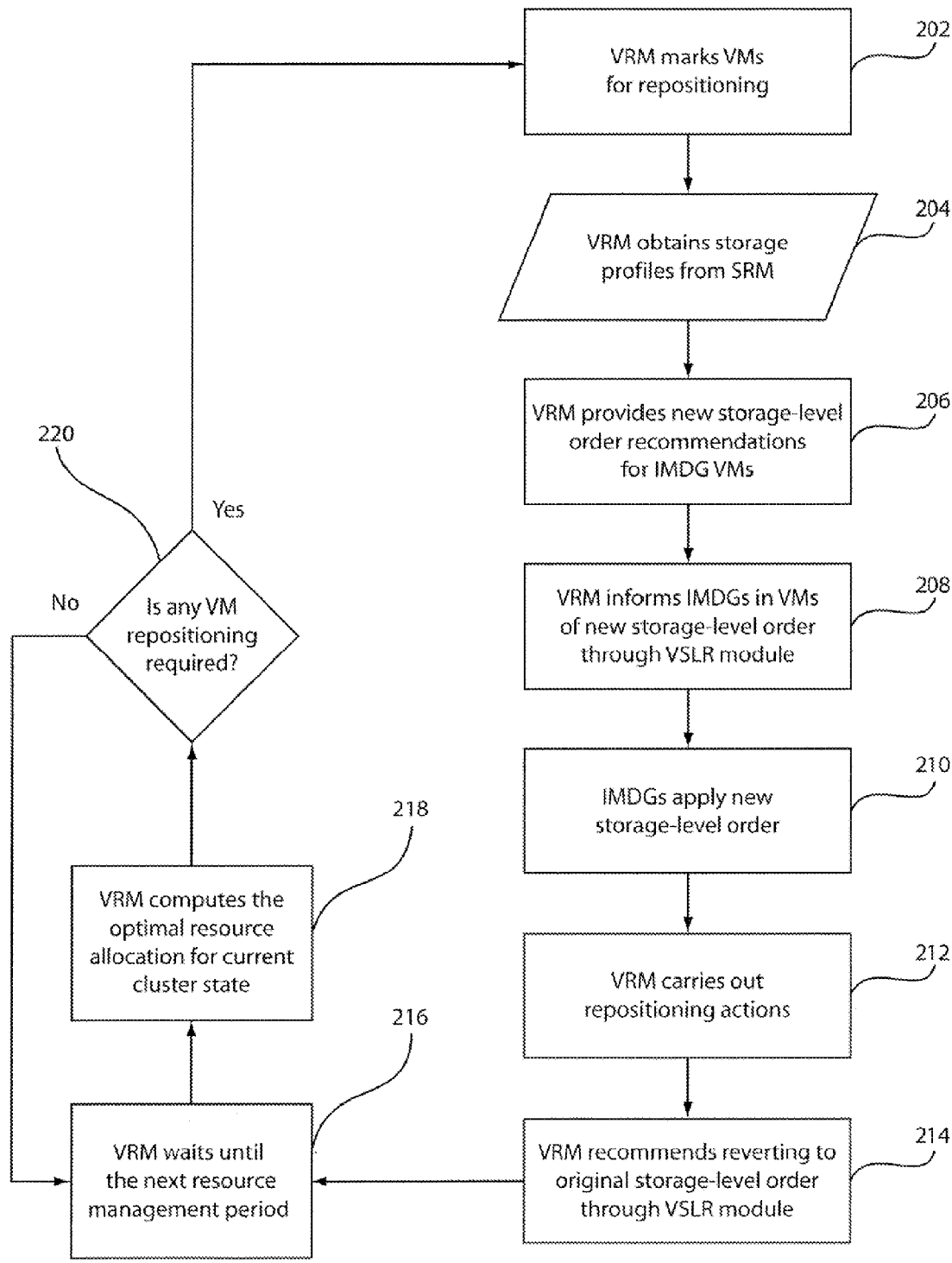
FIG. 2 is a block/flow diagram showing a system/method for repositioning VM's in accordance with the present principles.

Referring to FIG. 2, a method for implementing a change using storage-level orders is shown in accordance with one illustrative example. In block 202, a VRM marks VMs for repositioning. In block 204, the VRM obtains storage profiling information from the SRM. The SRM builds profiling information regarding the usage/availability of the multiple storage levels and devices in the system to obtain profiling information from the storage layer. For example, it may obtain effective bandwidth of local disks and network storage, memory usage of flash memory cards in physical machines, etc. Methods to obtain this type of information may take a plurality of forms. For example, existing products such as VMware may include built-in modules to obtain this profiling information with minimum overhead.

In block 206, VRM provides a new storage-level order recommendation for IMDG VMs. In block 208, VRM informs IMDGs in VMs of the new storage-level order through a VSLR module. In block 210, IMDGs apply the new storage-level order. In block 212, VRM carries out repositioning actions. Repositioning of VMs can be triggered due to many reasons. For example, maintenance tasks, e.g., shutting down a physical machine to perform remediation and upgrade tasks, dynamic resource management actions to mitigate dynamically-emerging resource contention issues, etc. There exist multiple techniques for repositioning VMs.

In block 214, VRM may recommend reverting to an original storage-level order through VSLR the module. In block 216, VRM waits until a next resource management period. In block 218, VRM computes an optimal resource allocation for a current cluster state or memory hierarchy. In block 220, a determination as to whether any VM repositioning is needed is made. If yes, the path goes to block 202, and if no, the path goes to block 216.

Figure 3:
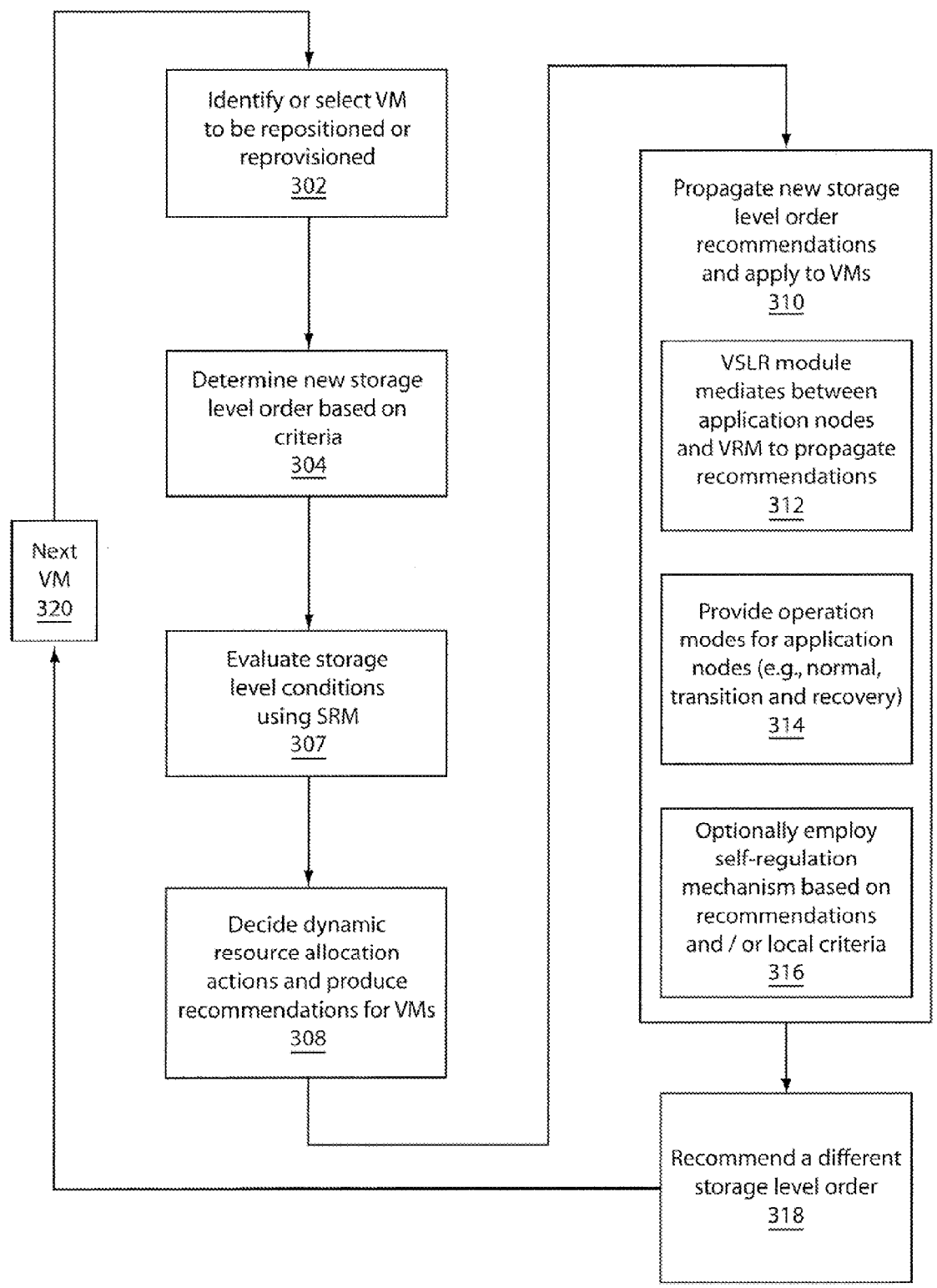
FIG. 3 is a block/flow diagram showing a system/method for intercooperation between technologies for executing a change in a virtualized environment in accordance with another embodiment.

Referring to FIG. 3, a method for reordering storage levels in a virtualized environment, which executes the repositioning of VMs more efficiently especially for memory intensive applications is illustratively depicted in accordance with one exemplary embodiment. The memory intensive application may include memory intensive applications in the form of in-memory data grids (IMDGs).

In block 302, a virtual machine (VM) to be repositioned to a new location and/or reprovisioned is identified or selected. In block 304, a new storage level order for the VM is determined that reduces a VM live state during a migration transfer and accounts for: shared storage memory, VM virtual disk locations and service level agreement (SLA) requirements imposed by an application, etc. to reduce recovery operations after dynamic resource allocation actions. Other considerations may also be employed in making the recommendation. In one embodiment, in block 307, storage level conditions are evaluated by a virtualization resource manager (VRM) using a storage resource manager (SRM), which provides profile information for different storage levels. In block 308, the VRM decides on dynamic resource allocation actions, and produces storage level reordering recommendations for different VMs.

In block 310, the new storage level order recommendation is propagated to VMs and the new storage level order is applied in the VMs. In block 312, a virtualization- and dynamic-resource-allocation-aware storage level reordering (VSLR) module mediates between application nodes (e.g., the IMDG nodes) and the VRM to propagate VRM recommendations to each node, monitor node actions and report current behavior to VRM.

In block 314, application nodes (e.g., IMDGs) include distinct operation modes for normal operation, transition mode when a storage level is reordered, and recovery mode to return to normal operation after the transition mode. The modes are provided to ensure efficient transition actions (e.g., repositioning or reprovisioning). In block 316, the nodes (e.g., IMDGs) may employ at least one additional intelligent self-regulation mechanism to dynamically choose a storage level order based on VSLR recommendations and local optimality criteria. The IMDG node or other node can take the recommendation of the VRM or may override the recommendation in accordance with selected criteria. For example, the VRM may recommend the nodes to set RAM-based storage to the highest level (i.e., primary), however in accordance with local CPU or memory usage monitoring, the node may select to disk-based storage. By means of simple feedback control mechanisms the node can also leverage information regarding the performance perceived by the application (e.g., response time, throughput). For instance, the VRM may recommend a 2-level storage hierarchy to the nodes including flash-based and disk-based storage as primary and secondary level respectively. If the application has reported poor throughput, the nodes may favor a more responsive storage ordering such as the one having RAM-based and flash-based storage, respectively.

In block 318, a different storage-level order is recommended after the repositioning actions. This may include reverting back to the original storage-level order after the repositioning actions, or adopting a new storage level order. In block 320, a next VM to be transitioned is considered until all VMs selected or identified for transitions are reached.

Having described preferred embodiments for virtualization and dynamic resource allocation aware storage level reordering (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for reordering storage levels in a virtualized environment, comprising:
   determining a new storage-level order for one or more virtual machines (VMs) that reduces a VM live state during a transition, and accounts for hierarchical shared storage memory and criteria imposed by an application; and
   applying the new storage-level order in the VMs.

2. The method as recited in claim 1, wherein the application includes memory-intensive applications in the form of in-memory data grids (IMDGs).

3. The method as recited in claim 2, wherein the IMDGs have distinct operation modes for a normal mode, a transition mode when a storage level is reordered, and a recovery mode to return to normal operation after the transition mode.

4. The method as recited in claim 1, wherein determining a new storage-level order includes evaluating storage-level conditions by a virtualization resource manager (VRM) using a storage resource manager (SRM), which provides profile information for different storage levels.

5. The method as recited in claim 4, wherein the VRM decides on dynamic resource allocation actions, and produces storage-level reordering recommendations for different VMs.

6. The method as recited in claim 5, further comprising: mediating between in-memory data grid (IMDG) nodes and the VRM using a virtualization- and dynamic-resource-allocation-aware storage-level reordering (VSLR) module, wherein the VSLR module propagates VRM recommendations to each IMDG node and monitors IMDG actions and reports current behavior to the VRM.

7. The method as recited in claim 6, wherein the IMDGs employ at least one additional intelligent self-regulation mechanism to dynamically choose a storage-level order based on VSLR recommendations and local optimality criteria.

8. A non-transitory computer-readable storage medium comprising a computer-readable program for reordering storage levels in a virtualized environment, wherein the computer-readable program when executed on a computer causes the computer to perform the steps of:
   determining a new storage-level order for one or more virtual machines (VMs) that reduces a VM live state during a transition, and accounts for hierarchical shared storage memory and criteria imposed by an application; and
   applying the new storage-level order in the VMs.

9. The computer-readable storage medium as recited in claim 8, wherein the application includes memory intensive applications in the form of in-memory data grids (IMDGs).

10. The computer-readable storage medium as recited in claim 9, wherein the IMDGs have distinct operation modes for a normal mode, a transition mode when a storage-level is reordered, and a recovery mode to return to normal operation after the transition mode.

11. The computer-readable storage medium as recited in claim 8, wherein determining a new storage-level order includes evaluating storage-level conditions by a virtualization resource manager (VRM) using a storage resource manager (SRM), which provides profile information for different storage levels.

12. The computer-readable storage medium as recited in claim 11, wherein the VRM decides on dynamic resource allocation actions, and produces storage-level reordering recommendations for different VMs.

13. The computer-readable storage medium as recited in claim 12, further comprising mediating between the in-memory data grid (IMDG) nodes and the VRM using a virtualization- and dynamic-resource-allocation-aware storage-level reordering (VSLR) module, wherein the VSLR module propagates VRM recommendations to each IMDG node and monitors IMDG actions and reports current behavior to the VRM.

14. The computer-readable storage medium as recited in claim 13, wherein the IMDGs employ at least one additional intelligent self-regulation mechanism to dynamically choose a storage level order based on VSLR recommendations and local optimality criteria.

15. The computer-readable storage medium as recited in claim 13, further comprising:
   a virtualized resource manager (VRM) configured to recommend a new storage-level order in a memory media hierarchy for the VM that reduces a VM live state during reprovisioning or migration, accounts for storage levels based upon profiling information, and reduces recovery operations after dynamic resource allocation actions; and
   a virtualization- and dynamic-resource-allocation-aware storage-level reordering (VSLR) module configured to propagate and apply the new storage-level order recommendation to appropriate memory intensive VMs such that reordering mitigates the performance overhead of VM reprovisioning or repositioning actions.

16. A system for dynamically reordering storage levels for applications in virtualized systems, comprising:
   a virtual machine (VM) to be reprovisioned or repositioned, stored in a non-transitory memory storage device;
   a virtualized resource manager (VRM) configured to recommend a new storage-level order in a memory media hierarchy for the VM that reduces a VM live state during reprovisioning or migration, and accounts for storage levels based upon profiling information; and
   a virtualization- and dynamic-resource-allocation-aware storage-level reordering (VSLR) module configured to propagate and apply, using a processor, the new storage-level order recommendation to appropriate VMs.

17. The system as recited in claim 16, wherein the memory-intensive VMs are in the form of in memory data grids (IMDGs).

18. The system as recited in claim 17, wherein the IMDG includes distinct operation modes including a normal mode, a transition mode when the storage level is reordered, and a recovery mode to return to normal operation after the transition mode.

19. The system as recited in claim 17, wherein the VSLR module acts as a mediator between an IMDG node and the VRM such that the VSLR module propagates VRM recommendations to each IMDG node and the VSLR module monitors IMDG actions and reports current behavior to the VRM.

20. The system as recited in claim 17, wherein the IMDG node is configured to employ a self-regulation mechanism to dynamically choose its storage-level order based on VSLR recommendations and its local optimality criteria.

\* \* \* \* \*